United States Patent [19]

Laverty

[11] 4,351,532
[45] Sep. 28, 1982

[54] LABYRINTH SEAL

[75] Inventor: William F. Laverty, Glastonbury, Conn.

[73] Assignee: United Technologies Corporation, Hartford, Conn.

[21] Appl. No.: 782,157

[22] Filed: Mar. 28, 1977

Related U.S. Application Data

[63] Continuation of Ser. No. 618,542, Oct. 1, 1975, abandoned.

[51] Int. Cl.$^3$ .......................................... F16J 15/447
[52] U.S. Cl. ...................................................... 277/53
[58] Field of Search ...................................... 277/53–57

[56] References Cited

U.S. PATENT DOCUMENTS

| | | | |
|---|---|---|---|
| 1,168,002 | 1/1916 | Hirth | 277/53 |
| 1,689,735 | 10/1928 | Losel | 277/56 |
| 1,756,958 | 5/1930 | Schmidt | 277/56 |

Primary Examiner—Robert I. Smith
Attorney, Agent, or Firm—Robert C. Walker

[57] ABSTRACT

Apparatus for impeding the leakage of a fluid medium between the rotating and stationary components of a machine is disclosed. Disposed between the rotating and stationary components is a labyrinth seal including at least two throttle apertures to restrict the flow of the fluid medium across the seal. In one embodiment flow turning means direct fluid flowing from the first aperture into confronting relationship with flow approaching the second aperture.

6 Claims, 6 Drawing Figures

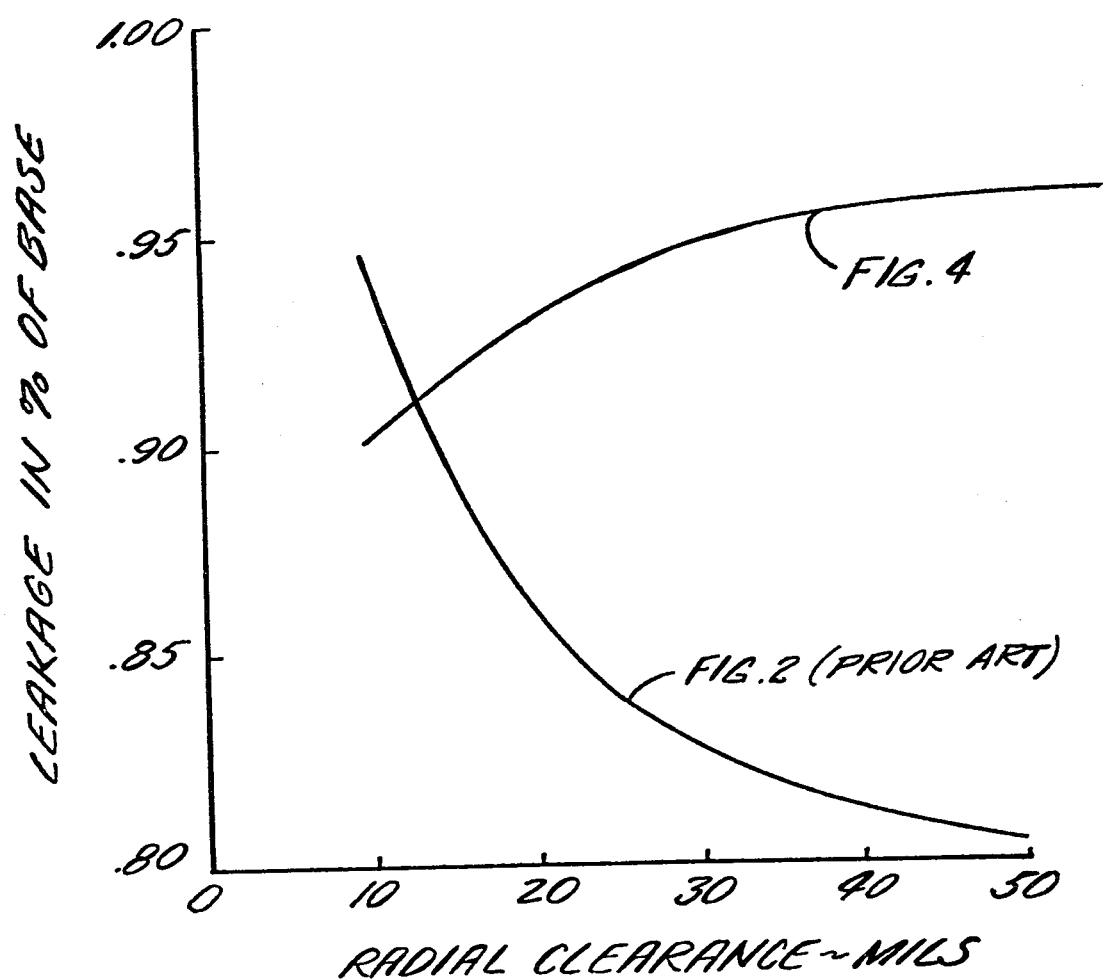

LABYRINTH SEAL

This is a continuation, of application Ser. No. 618,542, filed Oct. 1, 1975 now abandoned.

BACKGROUND OF THE INVENTION

1. Field of the Invention

This invention relates to rotary machines, and more particularly to labyrinth seals between the rotating and stationary components of the machine.

2. Description of the Prior Art

Labyrinth seals are typically utilized with rotating machinery to impede the leakage of a medium between rotating and stationary components from a high pressure region to a low pressure region. The seals are formed of a sealing surface on one component and restrictive ring on the other component which projects into close proximity with the sealing surface. A plurality of restrictive rings are commonly disposed in series to form alternating flow throttling and expanding regions along the labyrinth seal to reduce the pressure of the leakage medium through the dissipation of kinetic energy.

In gas turbine engines labyrinth seals are typically used to prevent the excessive leakage of air into the bearing compartments and to prevent the excessive leakage of air externally of the working medium flow path from one engine stage to another. One construction for sealing between adjacent stages in the turbine section of an engine is shown in U.S. Pat. No. 3,514,112 to Pettengill entitled "Reduced Clearance Seal Construction". A plurality of restrictive rings in Pettengill project toward corresponding sealing surfaces. A throttle aperture is formed between each ring and its corresponding sealing surface. An expansion chamber is formed between each pair of adjacent rings. Air leaking through the first throttle aperture flows through the downstream chambers and apertures to establish a stable pressure differential across the labyrinth.

In U.S. Pat. No. 3,572,728 to Smuland entitled "Rotary Seal", means disposed immediately downstream of the restrictive ring reverses leakage fluid back upstream toward the throttle aperture to decrease the apparent pressure differential across the aperture. The Smuland seal is effective in constructions having a small clearance between the restrictive ring and the sealing surface. Under large clearance conditions the leakage fluid tends to stagnate in the reversing region and the functional ability of the means becomes reduced.

In gas turbine engines diverse thermal environments frequently necessitate substantial initial clearance between rotating and stationary components to prevent destructive interference under transient conditions. Continuing efforts are underway to discover and develop sealing means between rotating and stationary components which are effective over varied clearance ranges.

SUMMARY OF THE INVENTION

A primary object of the present invention is to minimize the leakage of a fluid medium between rotating and stationary components of a machine. A more specific object is to inhibit leakage flow by providing a tortuous path between the rotating and stationary components. Further objects are to provide a series of flow restrictions and to provide means for turning the leakage flow sharply in a reversed direction as the flow approaches each succeeding downstream restriction.

According to the present invention a labyrinth seal in a machine between two components adapted for relative rotation is formed of a sealing surface and flow turning means on one component and a restrictive ring projecting from a platform on the other component, the surface and ring defining a first throttle aperture and the flow turning means and platform defining a second throttle aperture downstream of said first throttle aperture wherein fluid medium leaking through said first throttle aperture is directed by the flow turning means into opposing relationship with flow approaching said second throttle aperture to impede leakage flow therethrough.

A primary feature of the present invention is the first throttle aperture which is formed between the restrictive ring and the opposing sealing surface. Another feature is the second throttle aperture which is formed between the flow turning means and the platform. The flow turning means is operatively disposed so as to cause the medium leaking through the first throttle aperture to be redirected against the platform in the region immediately adjacent the upstream end of the second throttle aperture. In one embodiment at least two of the described labyrinth seals are disposed in series relationship to provide compounded resistance to leakage flow between the opposing components.

A principal advantage of the present invention is the reduced amount of leakage flow between rotating and stationary components of a machine. The kinetic energy of leakage flow through the first throttle aperture is effectively dissipated immediately upstream of the second throttle aperture in resistance to flow approaching the second aperture.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 6 is a graph comparing leakage in a prior art labyrinth seal similar to that shown in FIG. 2 with the improved labyrinth seal of the present invention as shown in FIG. 3.

DESCRIPTION OF THE PREFERRED EMBODIMENT

Figure 1:
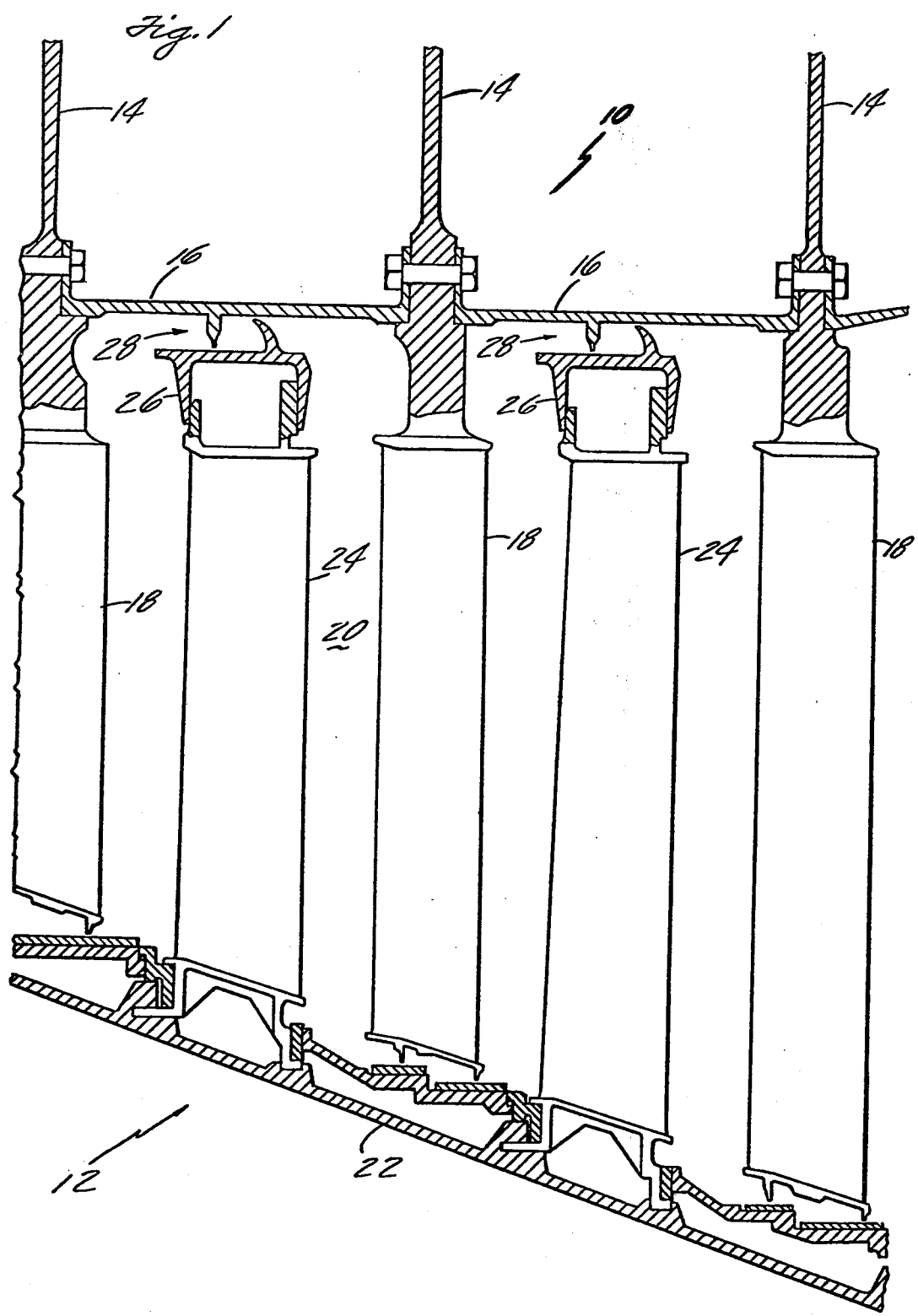
FIG. 1 is a simplified cross sectional view of a portion of the turbine section of a gas turbine engine showing a labyrinth seal disposed between adjacent rotor stages.

The simplified partial cross section view of a machine in FIG. 1 reveals internal components which are adapted for relative relation. The machine shown is a gas turbine engine and includes a rotating or rotor assembly 10 and a stationary or stator assembly 12. The rotor assembly includes a plurality of axially adjacent disks 14 which are separated by spacers 16. A plurality of turbine blades 18 extend radially from each disk. The blades of each disk are formed in a row which project across the flow path 20 for the working medium gases. A turbine case 22 of the stator assembly 12 radially encloses the rotor assembly. A plurality of turbine vanes 24 extend across the flow path 18 inwardly from the case 22. The turbine vanes are arranged in rows with one row being disposed between each pair of adjacent blade rows of the rotor assembly. The turbine vanes 24 are joined at their radially inward ends by an inner shroud 26. The leakage of working medium gases around the inner shroud is inhibited by a labyrinth seal 28 formed between the inner shroud 26 and the spacer 16.

Figure 3:
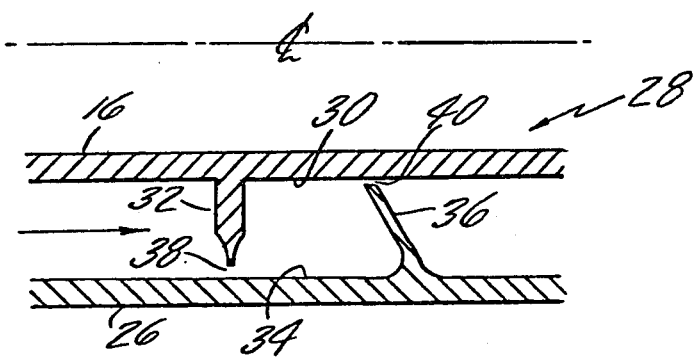
FIG. 3 is a simplified view of a labyrinth seal constructed in accordance with the present invention.
Figure 4:
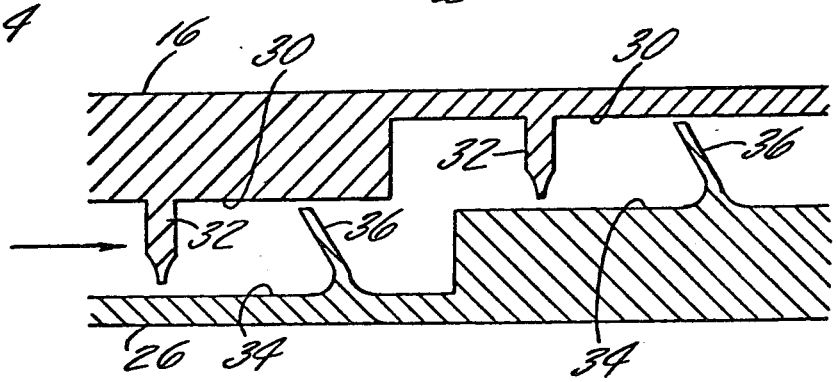
FIG. 4 is a simplified view of a stepped labyrinth seal constructed in accordance with the present invention.
Figure 5:
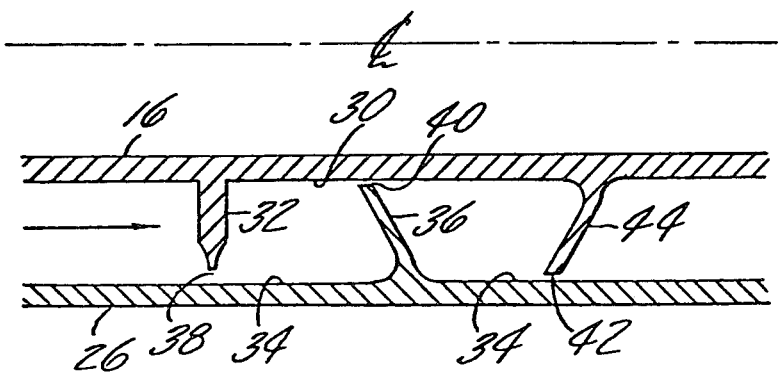
FIG. 5 is an alternate embodiment of a labyrinth seal constructed in accordance with the present invention.

A simplified representation of the labyrinth seal 28 is shown in FIG. 3. The spacer 16 has a circumferentially extending platform 30 and a restrictive ring 32 which projects radially outward from the platform. The inner shroud 26 has a circumferentially extending sealing surface 34 and flow turning means 36 which projects inwardly from the surface. A first throttle aperture 38 is formed between the restrictive ring 32 and the surface 34; a second throttle aperture 40 is formed between the flow turning means 36 and the platform 30. The above elements as described form a single seal unit which may be used individually or in series combination with adjacent seal units as is shown in FIG. 4. In an alternate embodiment shown in FIG. 5 a third throttle aperture 42 is formed between a second flow turning means 44 and the sealing surface 34 at a location downstream of the second throttle aperture 40.

During operation of the engine a small portion of the working medium from the flow path 20 leaks through the first aperture 38. The leakage flow is turned by the flow turning means 36 and directed against the platform 30 to inhibit flow through the second aperture 40. The kinetic energy of the leakage flow through the aperture 38 is dissipated in a region immediately upstream of the aperture 40 to discourage flow through said aperture 40. In the FIG. 5 embodiment the dissipation process is repeated downstream of the second aperture 40 as the flow through the second aperture is turned and directed against the surface 34 to inhibit flow through the third aperture 42. The flow turning means 36 and 44 are adapted in the figures shown to redirect the leakage flow in the upstream direction with respect to flow through the aperture 40 or the aperture 42. In an alternate construction within the scope of the present invention, the flow is discharged perpendicularly to the platform 30 upstream of the aperture 40. A preferred orientation of the discharge flow for any construction is in the direction which provides maximum impedance to flow through the downstream throttle aperture. In one specific embodiment a discharge angle of fifty degrees (50°) with respect to the platform proved particularly effective.

Preferred operating clearances for labyrinth seals between the rotating and stationary components of an engine generally fall within the range of five to thirty thousandths (0.005–0.030) of an inch although within the turbine section and elsewhere the clearance may be on the order of fifty thousandths (0.050) of an inch to protect against destructive interferences between the relatively rotating components. The FIG. 6 graph compares the sealing effectiveness of a FIG. 2 prior art type seal with a FIG. 3 type seal constructed in accordance with the present invention. The leakage through each seal type is plotted as a percentage of the leakage through a basic labyrinth seal having the same radial clearance but without flow turning means. In the prior art type seal of FIG. 2 the relative effectiveness of the seal decreases as the radial clearance increases. Conversely, in the present construction the relative sealing effectiveness dramatically increases as the radial clearance increases. Accordingly, the labyrinth seal of the present invention is particularly effective where substantial clearance or a wide range of clearances are required within the operating cycles of the engine.

Although the invention has been described with respect to an axial labyrinth seal the concepts are equally applicable to radial labyrinth seals wherein the sealing surface 34 and the platform 30 are essentially parallel, planar surfaces which are perpendicular to the axis of rotation of the machine.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. For preventing the leakage of a fluid medium between two components of a machine which are mounted for relative rotation, a labyrinth seal having an upstream throttle aperture and a downstream throttle aperture disposed in series relationship wherein said labyrinth seal further includes flow turning means operatively positioned between the upstream and downstream throttle aperture for directing leakage flow from the upstream aperture into opposing relationship to flow approaching the downstream aperture.

2. Apparatus for preventing the leakage of a fluid medium between two components of a machine which are mounted for relative rotation, comprising:
   a platform on the first of the two components;
   a circumferentially extending restrictive ring which projects from said platform;
   a sealing surface on the second of the two components which opposes said restrictive ring; and
   flow turning means which extend from said sealing surface downstream of the restrictive ring into close proximity with the platform of the first component wherein said flow turning means is adapted to cause leakage flow between the restrictive ring and the sealing surface to be discharged against the platform in opposition to leakage flow between the flow turning means and the platform.

3. The invention according to claim 2 wherein a radial seal is formed, said sealing surface and said platform being planar surfaces which are perpendicular to the axis of rotation of the machine.

4. The invention according to claim 2 wherein an axial seal is formed, said sealing surface and said platform being cylindrical surfaces which are concentric with the axis of rotation of the machine.

5. In a rotary seal for use between an outer stationary member having a cylindrical sealing surface and an inner rotating member having a restrictive ring which extends radially outward from a cylindrical platform on the rotating member into close proximity with the sealing surface of the stationary member to form a first aperture therebetween, the improvement which comprises:

flow turning means extending radially inward from the sealing surface of the stationary member into close proximity to the cylindrical platform of the rotating member at a position downstream of the first aperture to form a second throttle aperture wherein said flow turning means is adapted to cause the flow through said first aperture to be directed against the cylindrical platform immediately upstream of said second aperture.

6. The invention according to claim 5 wherein said flow is directed against the cylindrical platform in an upstream direction with respect to flow through said second throttle aperture.

* * * * *

UNITED STATES PATENT AND TRADEMARK OFFICE
CERTIFICATE OF CORRECTION

Figure 2:
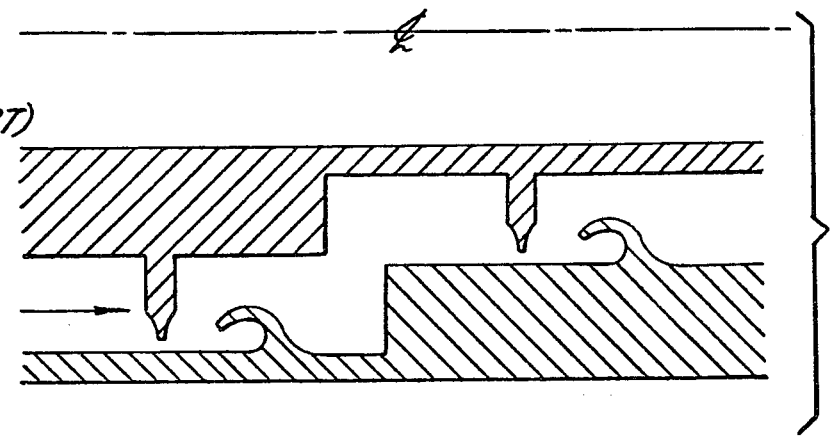
FIG. 2 is a simplified view of a prior art labyrinth seal.

PATENT NO. : 4,351,532
DATED : September 28, 1982
INVENTOR(S) : William F. Laverty It is certified that error appears in the above-identified patent and that said Letters Patent are hereby corrected as shown below:

In Fig. 6, the line on the graph identified as Fig. 4 should read -- Fig. 2 (prior art) --; and the line identified as Fig. 2 (prior art) should read -- Fig. 3 --.

Signed and Sealed this

Eighth Day of February 1983

[SEAL]

Attest:

Attesting Officer

GERALD J. MOSSINGHOFF

Commissioner of Patents and Trademarks